United States Patent
Ug

(10) Patent No.: US 9,864,675 B2
(45) Date of Patent: Jan. 9, 2018

(54) REGRESSION TESTING WITH EXTERNAL BREAKPOINTS

(71) Applicant: Anuradha Ug, Bengaluru (IN)

(72) Inventor: Anuradha Ug, Bengaluru (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/543,355

(22) Filed: Nov. 17, 2014

(65) Prior Publication Data

US 2016/0140027 A1    May 19, 2016

(51) Int. Cl.
*G06F 9/45* (2006.01)
*G06F 11/36* (2006.01)

(52) U.S. Cl.
CPC ...... *G06F 11/3688* (2013.01); *G06F 11/3624* (2013.01); *G06F 11/3636* (2013.01); *G06F 11/3692* (2013.01); *G06F 11/3696* (2013.01)

(58) Field of Classification Search
None
See application file for complete search history.

(56) References Cited

U.S. PATENT DOCUMENTS

| | | | | |
|---|---|---|---|---|
| 2007/0005322 A1* | 1/2007 | Patzer | ............ | G01R 31/31835 703/14 |
| 2008/0098382 A1* | 4/2008 | Declercq | ............ | G06Q 30/02 717/170 |
| 2008/0196025 A1* | 8/2008 | Meijer | ............ | G06F 8/45 717/177 |
| 2013/0212572 A1* | 8/2013 | Archer | ............ | G06F 8/65 717/171 |
| 2014/0201719 A1* | 7/2014 | Bates | ............ | G06F 11/362 717/129 |

* cited by examiner

*Primary Examiner* — Li B Zhen
*Assistant Examiner* — Lenin Paulino
(74) *Attorney, Agent, or Firm* — Mintz Levin Cohn Ferris Glovsky and Popeo, P.C.

(57) ABSTRACT

Regression testing of software applications is described. Breakpoints are inserted in a programming code of an object to perform testing of all software applications that use the object. A processor in a computing device can receive data representing a programming code of a functionality of a software application rectifying a problem associated with the functionality of the software application. The processor can determine another software application executing the functionality. The processor can insert a breakpoint in the programming code of the functionality of the software application and the another software application. The breakpoint can be inserted at a location in the programming code of the software application where the problem was rectified. The processor can execute the programming code of the functionality including the inserted breakpoint. The processor can determine, based on the executing, whether the problem has been rectified in the software application and the another software application.

20 Claims, 10 Drawing Sheets

REGRESSION TESTING WITH EXTERNAL BREAKPOINTS

TECHNICAL FIELD

The subject matter described herein generally relates to regression testing of software applications using external breakpoints, and in particular, to insertion of breakpoints in a programming code of an object to perform testing of software applications that use the object.

BACKGROUND

Various entities offer software applications that their clients can use. When a client using a software application notices a problem (which is sometimes also referred to as a bug or an error) in the execution of the software application, the client often reports it to the entity. Subsequently, the entity tests the software application for the problem, and once the problem is confirmed, identifies the problematic functionality in the software application. In response, the entity rectifies the functionality in the software application. However, there often exist situations that even when the rectified functionality functions properly in the software application, the rectified functionality still fails to properly execute in other software applications using this functionality. Thus, there exists a need to ensure that other software applications using the rectified functionality run/execute properly before assuring that the rectification is proper.

SUMMARY

The current subject matter relates to regression testing of software applications. Breakpoints are inserted in a programming code of an object to perform testing of all software applications that use the object.

In one aspect, data representing a programming code of a functionality of a software application rectifying a problem associated with the functionality of the software application can be received. Another software application executing the functionality can be determined. A breakpoint can be inserted in the programming code of the functionality of the software application and the another software application. The breakpoint can be inserted at a location in the programming code of the software application where the rectification of the problem was performed. The programming code of the functionality including the inserted breakpoint can be executed. Based on the executing, it can be determined whether the problem has been rectified in the software application and the another software application. At least one of the receiving, the determining of the another software application, the inserting, the executing, and the determining whether the problem has been rectified can be performed by at least one programmable processor.

In some variations, one or more of the following can be implemented either individually or in any suitable combination. The data representing the programming code of the functionality rectifying the problem can be received by a first computing device from a second computing device connected to the first computing device via a first communication network. The software application can be executed on a third computing device connected to the first computing device via a second communication network. The programming code of the functionality can be a part of a programming code of the software application. The programming code of the functionality can be a part of a programming code of the another software application.

Data representing the problem associated with the functionality of the software application can be received. The programming code of the functionality within the programming code of the software application can be determined. The data representing the problem and an identification of the programming code of the functionality can be sent. The data representing the problem and the identification of the programming code of the functionality can be used to generate the data representing the programming code of the functionality rectifying the problem.

The programming code of the functionality can be characterized by an object comprising at least one of: a class, a method, a function module, and a report. The data representing the programming code of the functionality rectifying the problem can indicate the location within the programming code of the functionality where the rectification has been performed. The breakpoint can be deleted after a predetermined period of time passes after the insertion of the breakpoint.

Computer program products are also described that comprise non-transitory computer readable media storing instructions, which when executed by at least one data processors of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The subject matter described herein can provide many advantages. For example, the current subject matter can ensure that software applications using a functionality, which was previously problematic and has now been rectified, can run/execute properly in order to assure that the rectification of this functionality has been properly performed. This assurance can prevent entities from a situation where they have to re-rectify a code at a later time due to problems caused by the rectified functionality. The process of re-rectification can be undesirable, as it can often lead to rolling back of changes made in the software application and/or downtime of the system during the process of re-rectification.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings:

FIG. 5 illustrates an exemplary graphical user interface displaying a solution document, according to some implementations of the current subject matter;

FIG. 8 illustrates an exemplary graphical user interface including a data editor that can display the rectified code of the problematic functionality, according to some implementations of the current subject matter;

When practical, like reference symbols in the various drawings indicate like elements.

DETAILED DESCRIPTION

Figure 1:
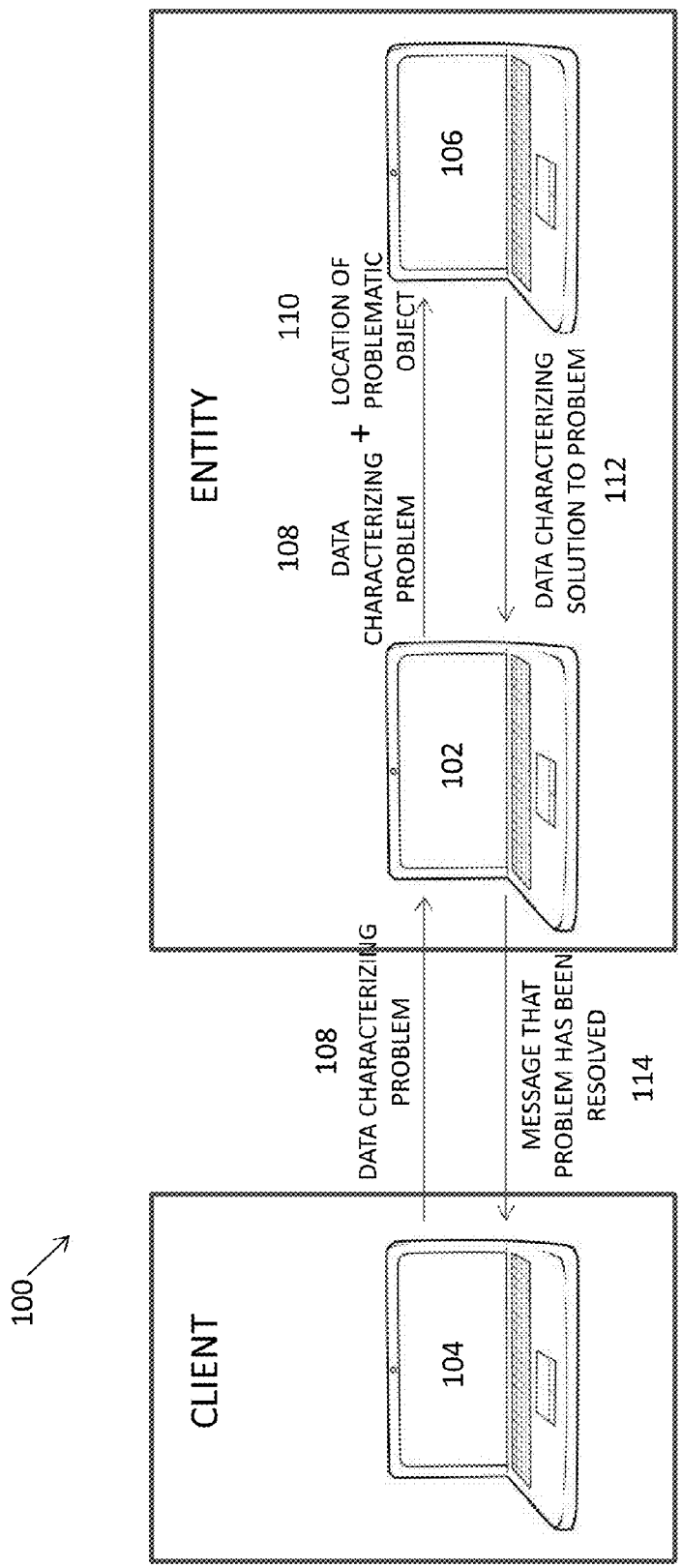
FIG. 1 illustrates an exemplary system for performing regression testing, according to some implementations of the current subject matter.

FIG. 1 illustrates an exemplary system 100 for performing regression testing, according to some implementations of the current subject matter. The system 100 can include a computing device 102 that can perform regression testing on a software application executing a functionality, in which a problem has been reported, and subsequently, can also perform regression testing on other software applications that implement this functionality. The system 100 can further include client computing devices 104 and 106. The computing device 102 can be operated by user(s) of a testing team of an entity offering the software application. The computing device 104 can be operated by user(s) of another entity that is a client of the entity offering the software application. The computing device 106 can be operated by user(s) of a development team of the entity offering the software application. Each of the computing devices 102, 104, and 106 can be one of: a laptop computer, a desktop computer, a tablet computer, a cellular smart phone, a phablet, and/or any other computing device.

Figure 3:
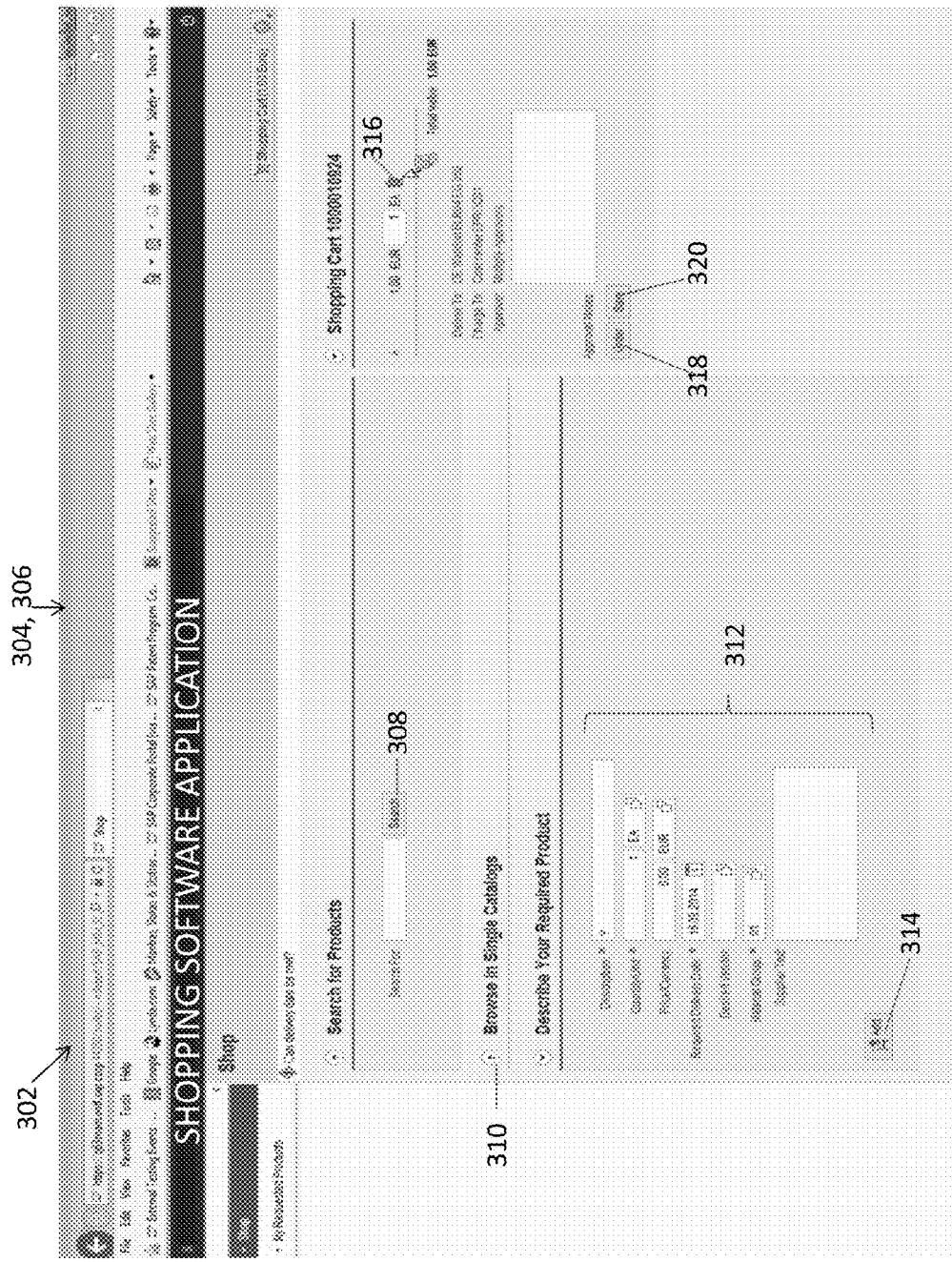
FIG. 3 illustrates an exemplary graphical user interface of a software application that executes a plurality of functionalities, according to some implementations of the current subject matter.

A software application can be a web application, such as a shopping web application (as shown by FIG. 3, which is described below in more detail), a flight selection application, a video game application, a stock trading application, and/or any other application. The software application can include a plurality of functionalities that can be executed by the application and/or the user. In some implementations, a functionality can be represented computationally by a functional object, which can be a portion of the entire programming code of the software application and can be characterized by at least one of: a class, a method, a function module, and a report within the entire programming code of the software application. In one non-limiting example, the functionality can be a remove link/button that can enable a shopper to remove items. This exemplary functionality, when used in the shopping application shown in FIG. 3 described below, can be used to remove products and/or services from a shopping cart of a shopper. This same functionality, when used in the flight selection application, can be used to remove flights from an account of a user. The remove items functionality can be used in a video game to remove players from a team selected in the video game. This functionality can be used in a stock trading application to remove stocks from a portfolio of a trader. Thus, the same functionality can be executed in multiple different software applications.

The computing device 104 can provide a client message application that users (for example, software programmers, system administrators, etc., and/or computing devices, software applications, business objects, business processes, etc.) operating the computing device 104 can use to provide feedback regarding an improperly working functionality (for example, the functionality is not performing a function that it is intended to perform by the developers and/or users of the software application) of the software application. In some implementations, the client message application can be a part of the software application. If there is a problem with a particular functionality of the software application, the user(s) operating the computing device 104 can provide feedback regarding the problem of the particular functionality in a client message document that can be generated using the client message application. For example, if the shopping cart of the shopping application of FIG. 3 discussed below fails to add new items in the shopping cart when a user operating the computing device 104 attempts to do so, this user can generate a client message document, such as the one shown by FIG. 4 described below. The computing device 104 can then send the data characterizing the problem (for example, in a form of a client message document) 108 to the computing device 102.

The computing device 102 can receive the data characterizing the problem 108 from the computing device 104. The computing device 102 can then identify a functional object (for example, a particular class, method, function module, report, or any other portion of the programming code for the entire software application) where the problem exists and that represents the programming code of the improperly working functionality within the software application. For example, if a remove items functionality of the shopping cart of the shopping application of FIG. 3 (discussed below) fails to remove items from the shopping cart, the computing device 102 can identify a location of the object (that is, a class, a method, a function module, a report, or any other portion of the programming code for the entire software application) associated with this problematic functionality within the programming code for the entire software application. The computing device 102 can send the data characterizing the problem (for example, the client message document) 108 and the location of the programming code of the problematic object within the programming code of the entire software application to the computing device 106.

The computing device 106 can receive the data characterizing the problem (for example, the client message document) 108 and the location of the problematic object within the programming code of the software application from the computing device 102. A user operating the computing device 102 can review the data characterizing the problem (for example, the client message document) 108 and the location of the problematic object to for the purposes of rectifying the problematic object (that is, to rectify the programming code for the problematic functionality). Rectifying a programming code can characterize modifying the programming code by fixing the programming error(s) in the programming code. The computing device 106 can execute a document generation application. The user operating the computing device 106 can use the document generation application to generate a solution document (for example, a note), such as the document shown by FIG. 5 discussed below. This solution document can characterize a solution to the problem by explaining details associated with rectification of the programming code of the object. The computing device 106 can then send this solution document to the computing device 102.

Figure 8:
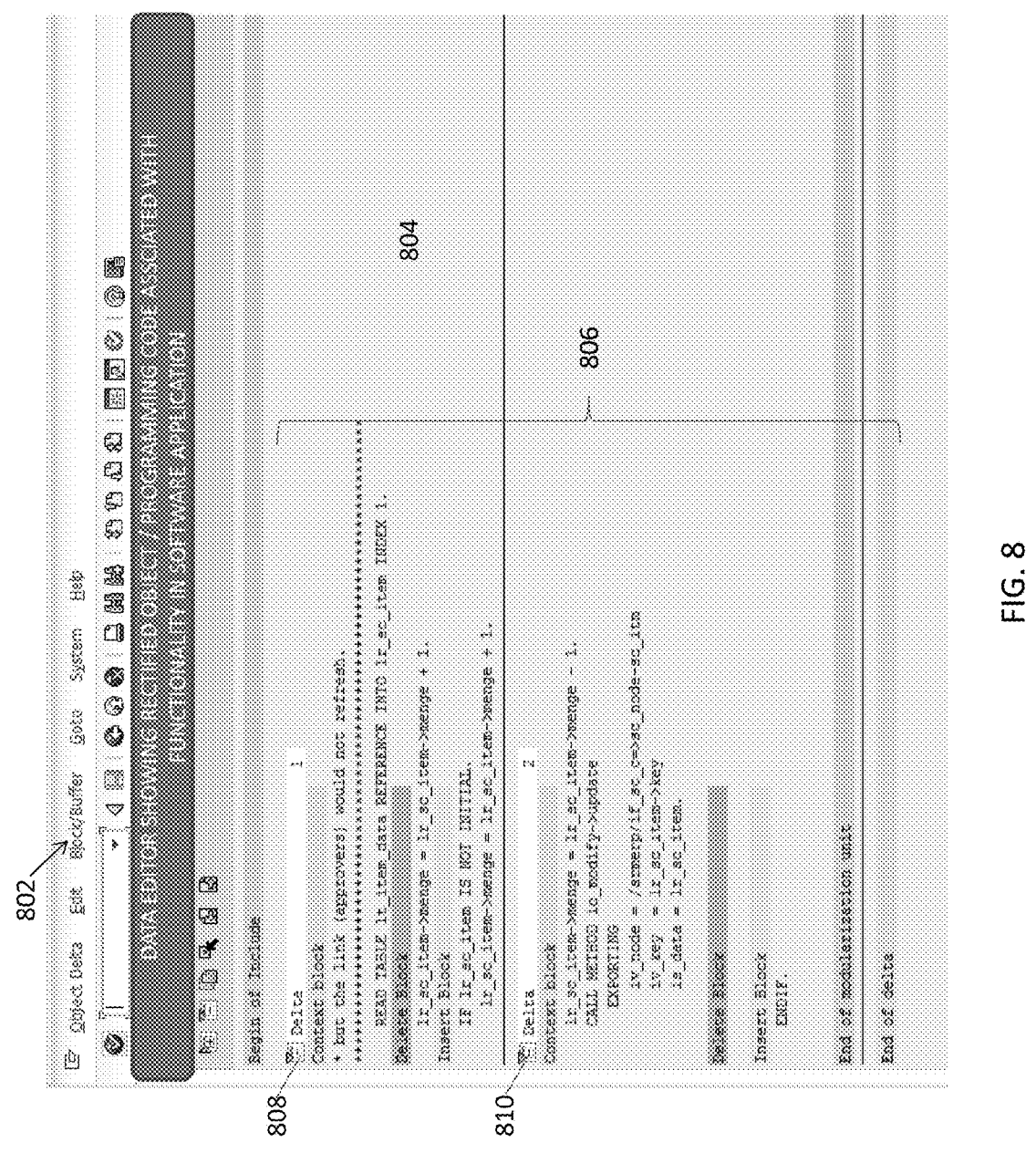

The computing device 102 can receive the data characterizing a solution (for example, the solution document, such as a note, and a location within the object where the programming code has been rectified) 112 from the computing device 104. The computing device 102 can then determine, find, and/or obtain other software application(s) that execute the problematic functionality. In one example, the computing device 102 can use graphical user interfaces shown in FIGS. 6 and 7 (described below) to generate a graphical user interface shown in FIG. 8 (described below), which shows a rectified object that was previously problematic. The computing device 102 can insert breakpoint(s) in the object (that is, the programming code for the problematic functionality) characterizing the problematic functionality in the software application. The computing device 102 can also insert breakpoints at same locations in the same object, which is a part of the programming code of other software applications executing the functionality associated with this object. In one example, one breakpoint can be inserted in the beginning of an object, and another breakpoint can be inserted immediately after the location within the rectified object where the changes to the programming code have been made, as shown by FIG. 8 described below. The computing device 102 can execute the software application and the other software application(s) using the breakpoints to ensure that: (a) the problem in the software application is solved, (b) the rectification of the object avoids reproducing the problem in the other software application(s) executing the functionality, and (c) the rectification of the object does not create new problems in execution of the functionality and/or other functionalities in the other software application(s).

If the computing device 102 does not cause any problems in the software application and/or the other software application(s), the computing device 102 can send a message 114 indicating that the problem has been resolved to the computing device 104.

Figure 2:
FIG. 2 illustrates an exemplary process for regression testing, according to some implementations of the current subject matter.

FIG. 2 illustrates an exemplary process 200 of regression testing performed by the computing device 102, in accordance with some implementations of the current subject matter. The computing device 102 can receive, at 202, the data characterizing the problem 108 from the computing device 104. The computing device 102 can then identify, at 204, an object within a programming code of the software application where the problem exists. For example, if functionality of removing items in the shopping cart of the shopping application of FIG. 3 discussed below fails to remove items from the shopping cart, the computing device 102 can identify, at 204, a location of an object associated with the improperly working functionality within a programming code for the software application. The computing device 102 can send, at 206, the data characterizing the problem (for example, the client message document) 108 and the location of the programming code of the problematic object within the programming code of the entire software application to the computing device 106.

The computing device 102 can receive, at 208, the data characterizing a solution (for example, the solution document, such as a note, and a location within the rectified object) 112 from the computing device 104. The computing device 102 can then determine, find, and/or obtain, at 210, other software application(s) that execute the functionality, the programming code for which has been rectified. In one example, the computing device 102 can use the graphical user interfaces shown by FIGS. 6 and 7 (described below) to generate the graphical user interface shown by FIG. 8 (described below), which shows the rectified object. The computing device 102 can insert, at 212, breakpoint(s) in the object in each of the other software application(s). The breakpoint can be inserted immediately after the location within the rectified object where the changes to the programming code have been made, as shown by FIG. 8 described below. The computing device 102 can execute, at 214, the software application and/or other software application(s) executing the same (or similar in other implementations) problematic functionality using the breakpoint(s) to ensure that the rectification of the object avoids reproducing the problem in those other software application(s) executing the object while solving the problem in the first software application.

Once the computing device 102 does not cause any problem in the software application and the other software application(s), the computing device 102 can send a message 114 indicating that the problem has been resolved to the computing device 104.

FIG. 3 illustrates an exemplary graphical user interface 302 of a software application 304 that is executed and displayed by the computing device 104, in accordance with some implementations of the current subject matter. The software application 304 can be a shopping application 306 on the web. Although a shopping application 306 is described herein, in other implementations, any other software application 304 can be any other application that provides one or more functionalities to a user operating the computing device 104.

The shopping application 306 can provide many functionalities to users, including one or more of at least the following: (a) a search link/button 308 that can allow a user operating the computing device 104 to search for products; (b) a browsing option 310 that can allow this user to browse for products in catalogs; (c) search fields 312 where this user can input criteria for required or desired products, such as a description of those products, a quantity of those products, a price or currency range for the desired product; a delivery date by which the products are required or desired, a vendor from whom the products are desired, and a material group characterizing a category of the products (for example, material group 01 can refer to stationary, material group 02 can refer to computer accessories, material group 03 can refer to pantry items, or so on) associated with the required or desired products; (d) an add link/button 314 that can allow this user to add a product to a shopping cart; (e) a remove link/button 316 that can allow this user to remove one or more products (which were previously added to the shopping cart) from the shopping cart; (f) an order link/button 318 that can allow this user to order the products on the shopping cart; and (e) a save link/button 320 that can allow the user to save the selected products in the shopping cart so that the user can seem those selected products again when the user logs in again after logging out of the shopping application 306.

The computing device 104 can execute and display a client message application. If the user operating the computing device 104 notices a problem or error in any functionality of the software application 304 (for example, the user notices a problem in one or more of the (a), (b), (c), (d), (e), and (f) functionalities noted above in the shopping application 306), the computing device 104 can enable the user to report the problem to an entity offering the software application 304 via a client message document generated using the client message application. One example of the client message document is shown by FIG. 4, which is described below in more detail.

Figure 4:
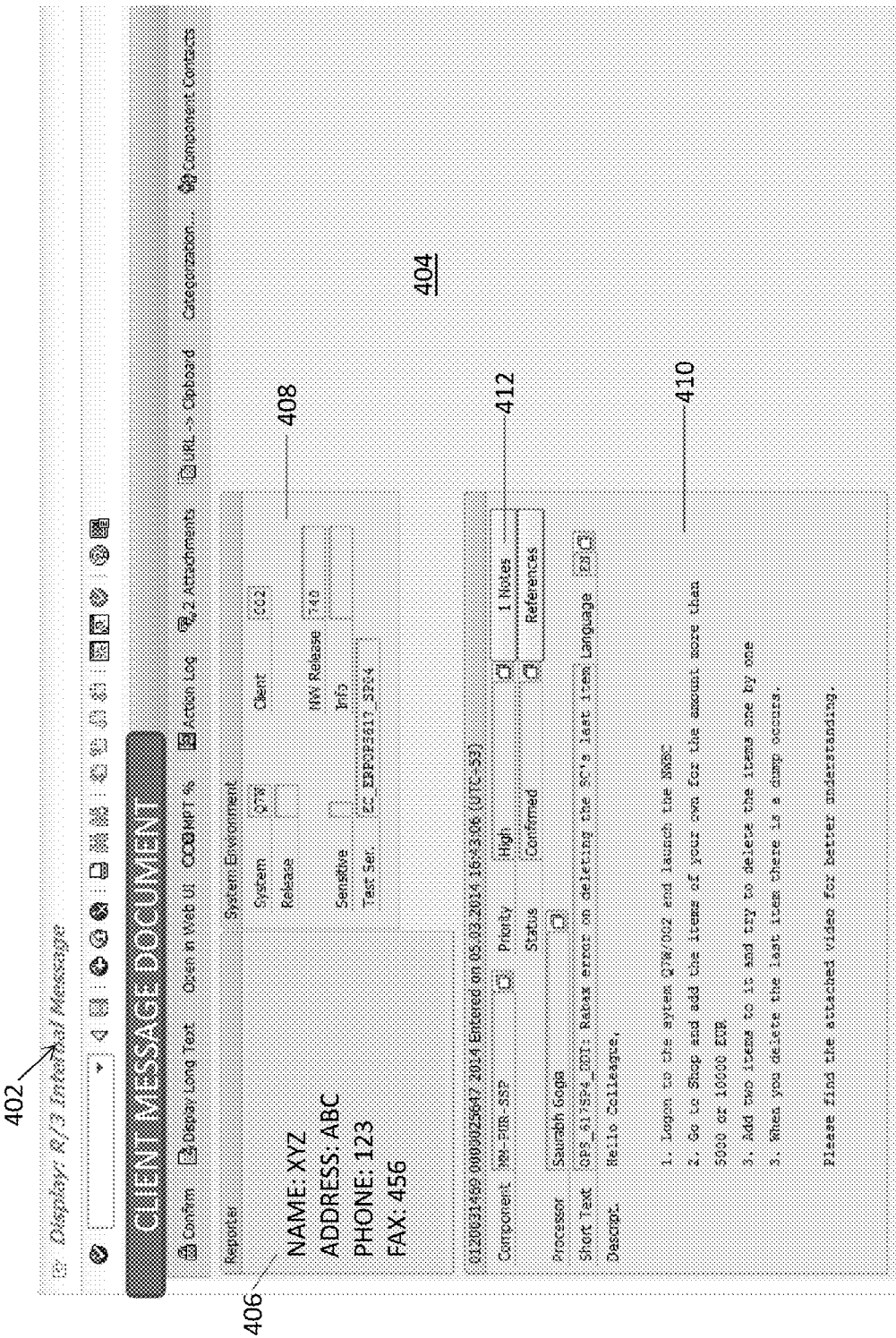
FIG. 4 illustrates an exemplary graphical user interface displaying a client message document, according to some implementations of the current subject matter.

FIG. 4 illustrates an exemplary graphical user interface 402 displaying the client message document 404 that has been generated using a client message application executed on the computing device 104, in accordance with some implementations of the current subject matter. The computing device 104 can display the graphical user interface 402. The client message document 404 can include: identification details and contact details 406 of the user reporting the problem, a system environment 408 (for example, structural details of the system) where the problem occurred, and data 410 describing the problem.

The computing device 104 can send the client message document 404 to the computing device 102 once the client message document 404 has been completed. A user operating the computing device 102 can review the client message document 404 to determine a location of the problem in the code of the software application 304 (for example, the shopping application 306, which is shown by FIG. 3 discussed above). For example, if a particular functionality (for example, removing items from a shopping cart) associated with an object (for example, programming code associated with remove link/button 316) does not work properly, the user operating the computing device 102 can determine a location of the object within a programming code for the software application. In one example, the location can be line number(s) of the programming code where the problem lies. The computing device 102 can send the client message document 404 and the location of the problem in the programming code to the computing device 106.

The user operating the computing device 106 can rectify the problem in the programming code of the problematic object. The computing device 106 can execute and display a document generation application, which can be used to generate a solution document (which can also be referred to as a note), such as the document shown by FIG. 5, which is described below. After this solution document shown in FIG. 5 has been generated, the graphical user interface 402 can display the button 412. When the button 412 is selected, the computing device 102 can display the solution document shown in FIG. 5.

Figure 5:
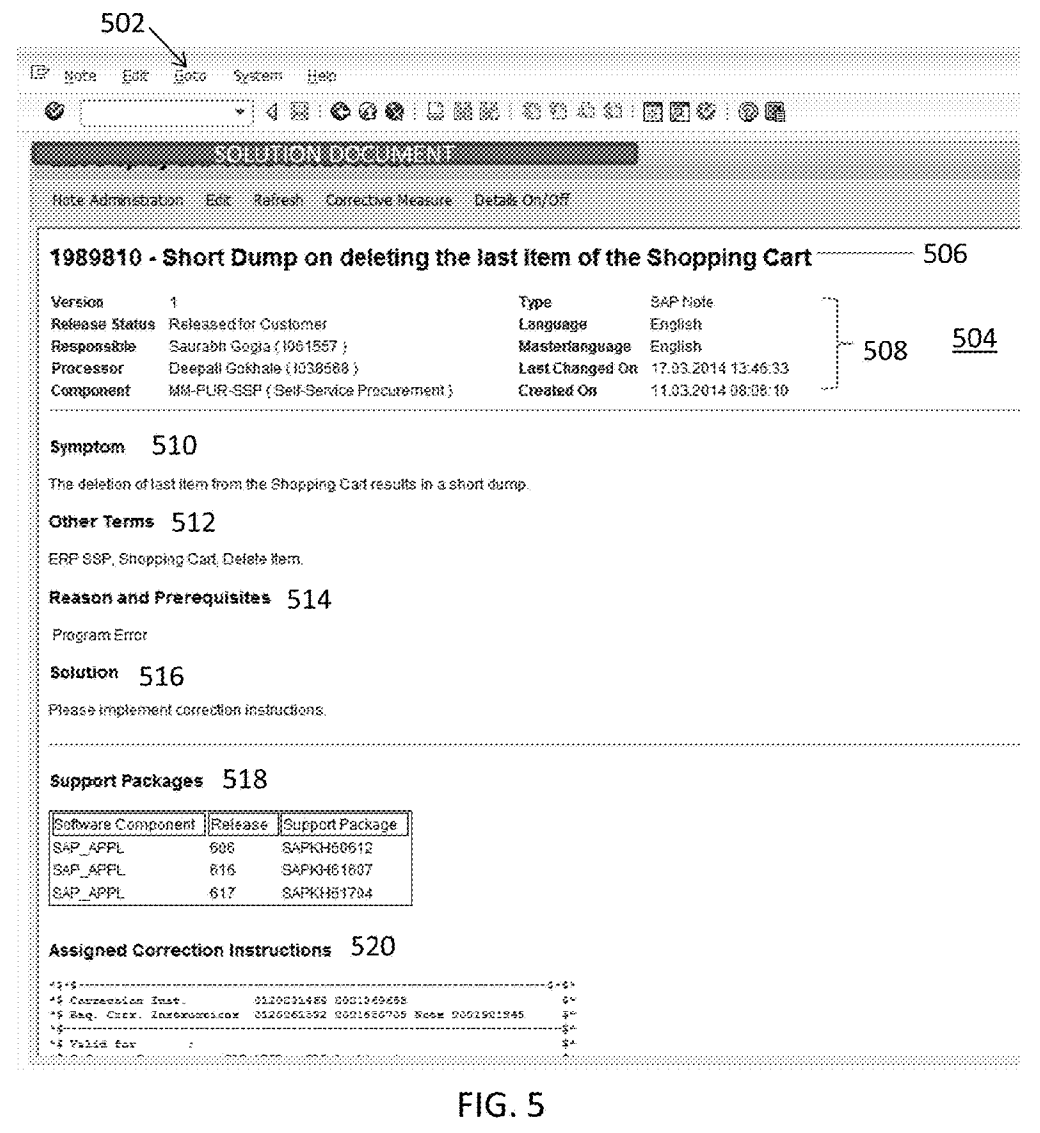

FIG. 5 illustrates an exemplary graphical user interface 502 displaying a solution document 504 generated using a document generation application executed on the computing device 106, in accordance with some implementations of the current subject matter. The computing device 106 can execute and display the graphical user interface 502. The solution document 502 can include one or more of at least the following: (a) name or title 506 of the problem identified on the computing device 104; (b) data 508 identifying characteristics associated with the problem; (c) symptoms 510 of the problem identified, as determined on the computing device 106; (d) other terms 512 characterizing tags (for example, words or phrases) specific to the problem; (e) reason 514 for the problem and prerequisites associated with the solution of the problem; (f) instructions 516 for viewing the rectified programming code; (g) validity (not shown in the figure) characterizing releases or versions of the software application to which the solution is applicable; and (h) support packages 518 including enhancements for each release or version of the software application; and (i) assigned correction instructions, which are described in more detail below.

Figure 6:
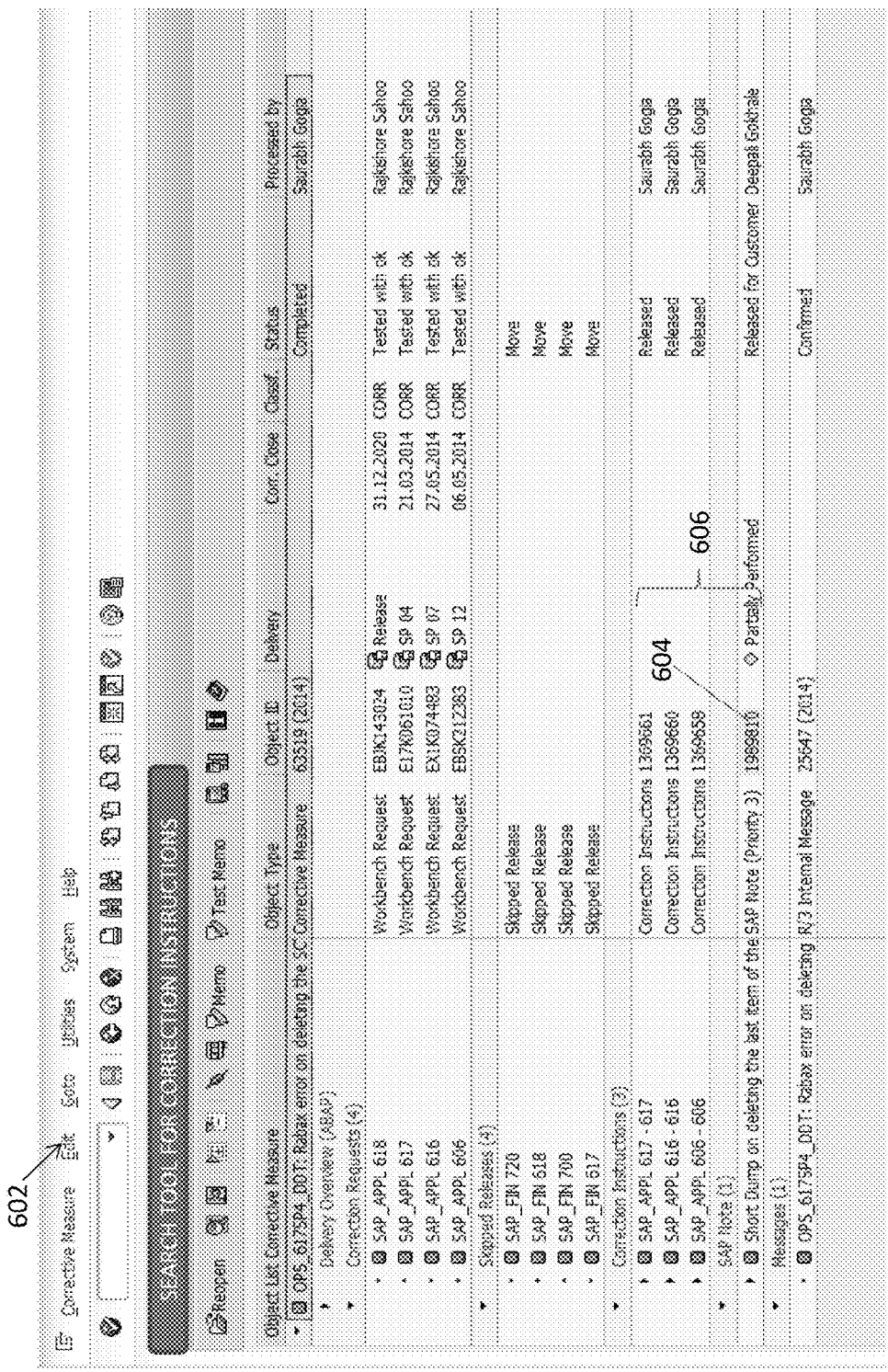
FIG. 6 illustrates an exemplary graphical user interface that can be used to search for a correction instruction, according to some implementations of the current subject matter.
Figure 7:
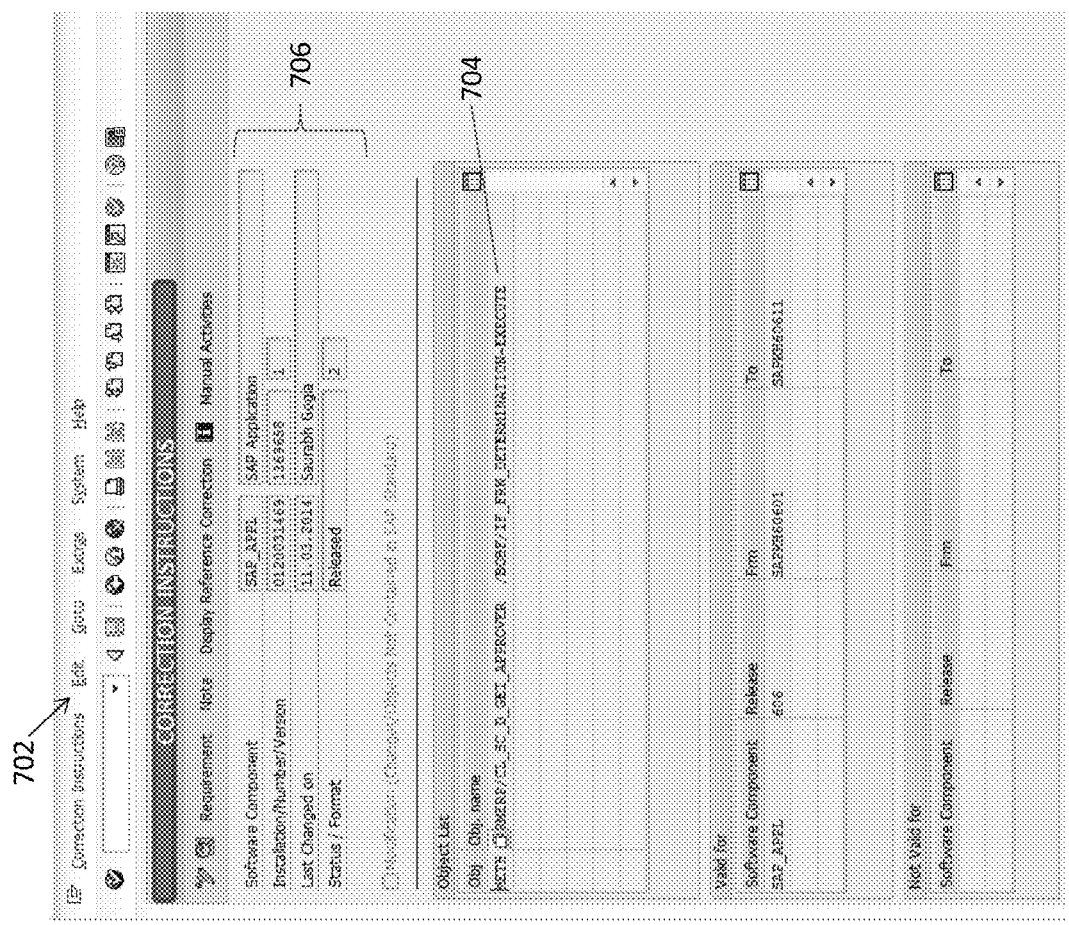
FIG. 7 illustrates an exemplary graphical user interface that displays a link to a rectified programming code of a functionality, which was previously problematic and has now been rectified, according to some implementations of the current subject matter.

The computing device 106 can send the solution document 502 to the computing device 102. A user operating the computing device 102 can extract the instructions 516 in the solution document 502 to view the rectified programming code of the previously-problematic and now-rectified object. In the example shown in FIG. 5, the instructions 516 mention that the particular correction instructions need to be executed to view the rectified programming code of the object. The computing device 102 can then display another graphical user interface, as shown by FIG. 6 (described below in more detail), which the user can use to search for those particular correction instructions. When the user clicks/selects data identifying those particular correction instructions, the computing device 102 can display a yet another graphical user interface, as shown by FIG. 7 (described below in more detail), which displays a link to the rectified object code. When the user clicks/selects this link to the rectified code, the computing device 102 can display a graphical user interface showing the data editor with the rectified code for the object, as shown by FIG. 8 (described below).

FIG. 6 illustrates an exemplary graphical user interface 602 that the user operating the computing device 102 can use to search for a particular correction instruction 604 mentioned in the instructions 516 shown in FIG. 5, in accordance with some implementations of the current subject matter. The computing device 102 can execute and display the graphical user interface 602. The graphical user interface 602 can display data characterizing a plurality of correction instructions 606, from which the user can select the particular correction instruction 604 mentioned in the instructions 516.

When the user operating the computing device 102 clicks/selects data identifying those particular correction instructions 604, the computing device 102 can display a yet another graphical user interface, as shown by FIG. 7 (described below), which displays a link to the rectified object code.

FIG. 7 illustrates an exemplary graphical user interface 702 that displays a link 704 to the rectified programming code of the object, which was previously problematic and has now been rectified, in accordance with some implementations of the current subject matter. The computing device 102 can display the graphical user interface 702. The graphical user interface 702 can further include data 706 associated with the rectification of the programming code of the problematic object.

When the user operating the computing device 102 clicks/selects the link 704 to the rectified programming code of the object, the computing device 102 generates another graphical user interface, as shown by FIG. 8, which is described below.

FIG. 8 illustrates an exemplary graphical user interface 802 including a data editor 804 that can display the rectified code 806 of the previously problematic object, in accordance with some implementations of the current subject matter. The data editor 804 can also display, using highlighting of statements with colors and/or insertion of new comments in the code, the locations where the original programming code was rectified.

The user operating the computing device 102 can insert a first breakpoint 808 in the beginning of the programming code 806, and a second breakpoint 810 immediately after the location where the programming code 806 has been rectified. The first breakpoint 808 and the second breakpoint 810 can be external breakpoints. Each of the first breakpoint 808 and the second breakpoint 810 can be configured to be automatically deleted after a predetermined amount of time passes since the inserting of that breakpoint. The user operating the computing device 102 can then run/execute the programming code between the first breakpoint 808 and the second breakpoint 810 to ascertain that the programming code 806 for the object is working properly. Subsequently, the user operating the computing device 102 can also execute the programming code for the entire software application 304 (for example, shopping application 306) to ensure that the software application is executed without any problem that was reported by the computing device 104.

The computing device 102 can determine, find (for example, search), or obtain other software application(s) that each execute the object, the programming code 806 for which has been rectified. For example, if the object corresponds to an improperly working remove operation (as described above with respect to remove link/button 316) in the shopping application 306 shown in FIG. 3, the computing device 102 can determine other software applications that use this remove operation and hence rely on the programming code for the same object. An exemplary graphical user interface allowing this determining, finding, or obtaining of other software application(s) that each execute the object, the programming code 806 for which has been rectified, is shown by FIG. 9, which is described below in more detail.

The computing device 102 can place the first breakpoint 808 and the second breakpoint 810 in the programming code 806, and execute the programming code between the breakpoints for each of these other software applications to ensure that: (a) the problem in the software application 304 is not reproduced in other software applications, and (b) new problems are not encountered in those other software applications by rectifying for the original problem. This extensive testing of various software applications can also be referred to as regression testing.

When the computing device 102 confirms, by performing regression testing, that the problem is not reproduced in any of the software application and the other software application(s) and new problems do not come up due to the rectification of the code, the computing device 102 can send a message 114 indicating that the problem has been resolved to the computing device 104. Additionally, although each of the first breakpoint 808 and the second breakpoint 810 are configured to be automatically be deleted after a predetermined amount of time passes since the insertion of that breakpoint, the computing device 102 can delete each breakpoint (for example, each of the first breakpoint 808 and the second breakpoint 810) before sending the message 114. Such a deleting can advantageously ensure that there are no problems when the message 114 is sent before the predetermined amount of time (counting of which begins when a breakpoint is added) elapses.

Figure 9:
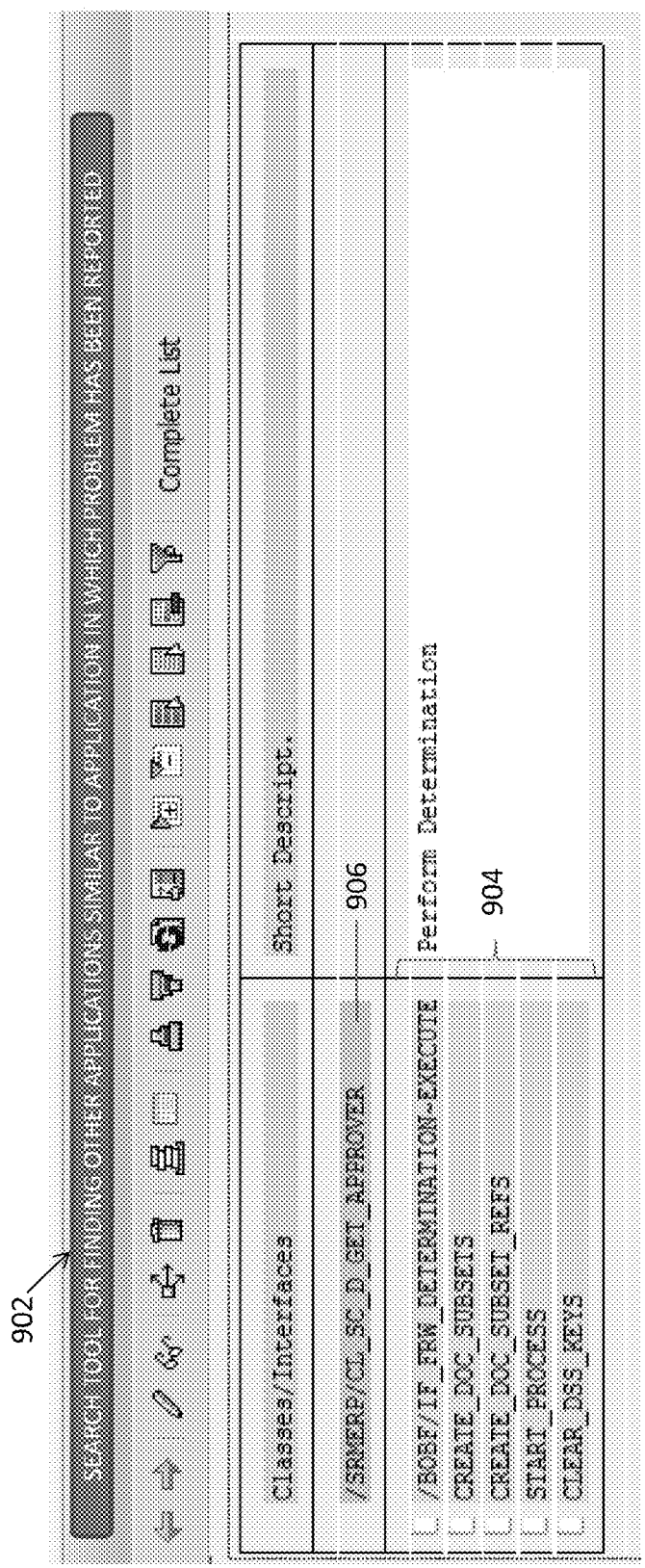
FIG. 9 illustrates an exemplary graphical user interface including a search tool to find (for example, search) other software application(s) that each execute the object, the programming code for which has been rectified, according to some implementations of the current subject matter.

FIG. 9 illustrates an exemplary graphical user interface 902 including a search tool to find (for example, search) other software application(s) 904 that each execute the object 906, the programming code 806 for which has been rectified. The computing device 102 can execute the graphical user interface 902. In one example, if the object 906 corresponds to an improperly working remove operation (as described above with respect to remove link/button 316) in the shopping application 306 shown in FIG. 3, the computing device 102 can determine other software applications 904 that use this remove operation and hence rely on the programming code for the same object 906.

The computing device 102 can place the first breakpoint 808 and the second breakpoint 810 in the programming code 806, and execute the programming code between the breakpoints for each of these other software applications 904 to ensure that: (a) the problem in the software application 304 is not reproduced in other software applications 904, and (b) new problems are not encountered in those other software applications 904 by rectifying for the original problem. This extensive testing of various software applications can also be referred to as regression testing.

Figure 10:
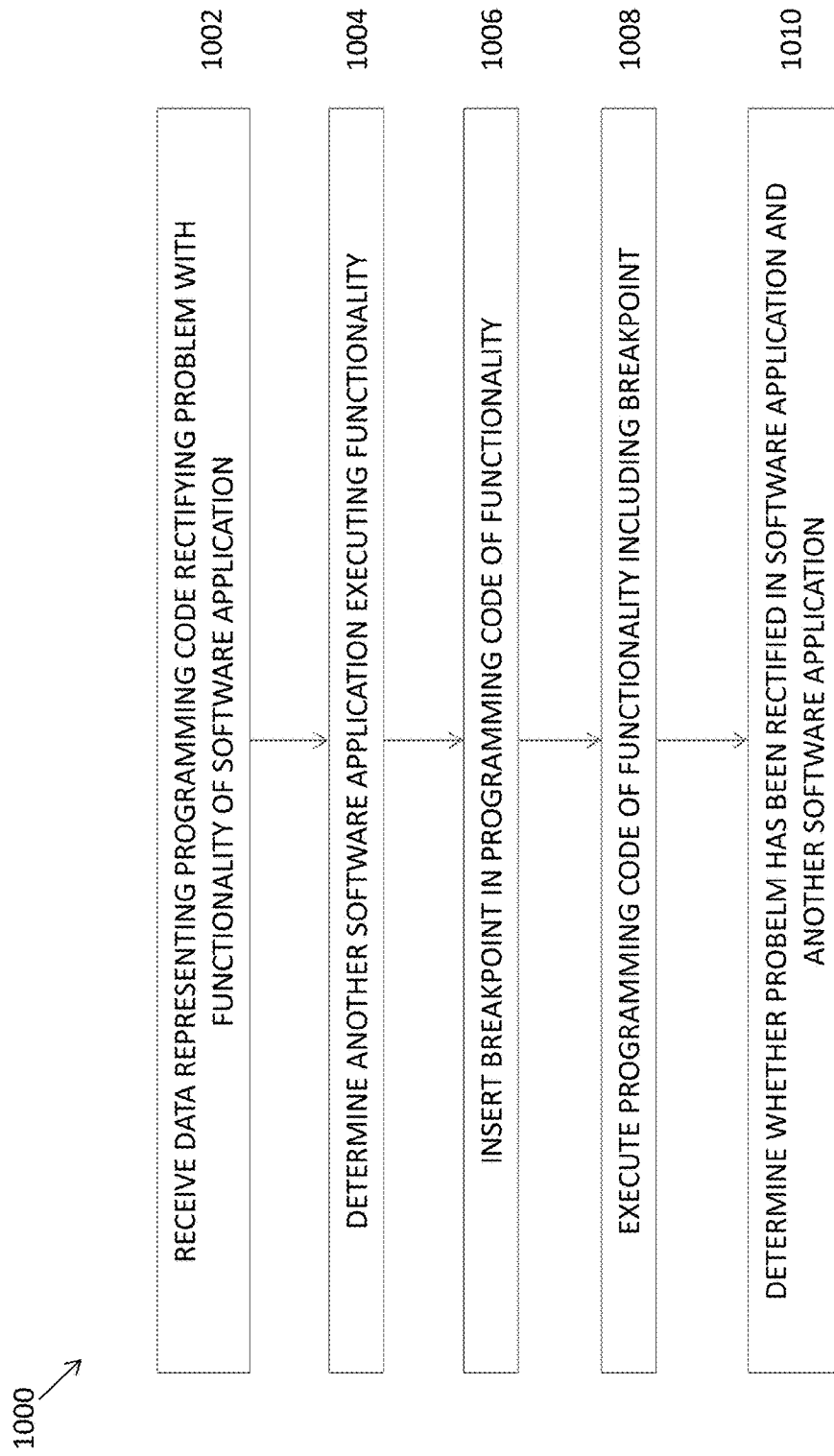
FIG. 10 illustrates another exemplary process for regression testing, according to some implementations of the current subject matter.

FIG. 10 illustrates another exemplary process 1000 for regression testing, according to some implementations of the current subject matter. The computing device 102 can receive, at 1002, data representing a programming code of a functionality of a software application rectifying a problem associated with the functionality of the software application. The computing device 102 can determine, at 1004, another software application executing the functionality. The computing device 102 can insert, at 1006, a breakpoint in the programming code of the functionality of the software application and the another software application. The breakpoint can be inserted at a location in the programming code of the software application where the rectification of the problem was performed. The computing device 102 can execute, at 1008, the programming code of the functionality including the inserted breakpoint. The computing device 102 can determine, at 1010 and based on the executing, whether the problem has been rectified in the software application and the another software application.

Various implementations of the subject matter described herein can be realized/implemented in digital electronic circuitry, integrated circuitry, specially designed application specific integrated circuits (ASICs), computer hardware, firmware, software, and/or combinations thereof. These various implementations can be implemented in one or more computer programs. These computer programs can be executable and/or interpreted on a programmable system. The programmable system can include at least one programmable processor, which can have a special purpose or a general purpose. The at least one programmable processor can be coupled to a storage system, at least one input device, and at least one output device. The at least one programmable processor can receive data and instructions from, and can transmit data and instructions to, the storage system, the at least one input device, and the at least one output device.

These computer programs (also known as programs, software, software applications or code) can include machine instructions for a programmable processor, and can be implemented in a high-level procedural and/or object-oriented programming language, and/or in assembly/machine language. As can be used herein, the term "machine-readable medium" can refer to any computer program product, apparatus and/or device (for example, magnetic discs, optical disks, memory, programmable logic devices (PLDs)) used to provide machine instructions and/or data to a programmable processor, including a machine-readable medium that can receive machine instructions as a machine-readable signal. The term "machine-readable signal" can refer to any signal used to provide machine instructions and/or data to a programmable processor.

To provide for interaction with a user, the subject matter described herein can be implemented on a computer that can display data to one or more users on a display device, such as a cathode ray tube (CRT) device, a liquid crystal display (LCD) monitor, a light emitting diode (LED) monitor, or any other display device. The computer can receive data from the one or more users via a keyboard, a mouse, a trackball, a joystick, or any other input device. To provide for interaction with the user, other devices can also be provided, such as devices operating based on user feedback, which can include sensory feedback, such as visual feedback, auditory feedback, tactile feedback, and any other feedback. The input from the user can be received in any form, such as acoustic input, speech input, tactile input, or any other input.

The subject matter described herein can be implemented in a computing system that can include at least one of a back-end component, a middleware component, a front-end component, and one or more combinations thereof. The back-end component can be a data server. The middleware component can be an application server. The front-end component can be a client computer having a graphical user interface or a web browser, through which a user can interact with an implementation of the subject matter described herein. The components of the system can be interconnected by any form or medium of digital data communication, such as a communication network. Examples of communication networks can include a local area network, a wide area network, internet, intranet, BLUETOOTH® network, infrared network, or other networks.

Although a few variations have been described in detail above, other modifications are possible. For example, the logic flows depicted in the accompanying figures and described herein do not require the particular order shown, or sequential order, to achieve desirable results. Other embodiments may be within the scope of the following claims.

What is claimed is:

1. A computer-implemented method, comprising:
receiving data representing a programming code of a functionality of a software application rectifying a problem associated with the functionality of the software application, the functionality being a removal of items, the software application being a shopping application, the items in the shopping item being one of at least one product and at least one service, the functionality within the shopping application allowing the removal of at least one product or at least one service from a shopping cart;
determining another software application executing the functionality, the software application being used to attain a purpose that is different from another purpose for which the another software application is to be used, the another software application being one of a flight selection application, a video game application, and a stock trading application, the functionality within the flight selection application being the removal of flights from a user account, the functionality within the video game application being the removal of players from a team, the functionality within the stock trading application being the removal of stocks from a portfolio;
inserting a breakpoint in the programming code of the functionality of the software application and the another software application, the breakpoint being inserted at a location in the programming code of the software application where the rectification of the problem was performed;
executing the programming code of the functionality including the inserted breakpoint; and
determining, based on the executing, whether the problem has been rectified in the software application and the another software application,
wherein at least one of the receiving, the determining of the another software application, the inserting, the executing, and the determining whether the problem has been rectified is performed by at least one programmable processor.

2. The computer-implemented method of claim 1, wherein:
the data representing the programming code of the functionality rectifying the problem is received by a first computing device from a second computing device connected to the first computing device via a first communication network, the rectifying of the problem being performed by the second computing device, the determining of the another software application being performed by the first computing device, the inserting of the breakpoint being performed by the first computing device; and
the software application is executed on a third computing device connected to the first computing device via a second communication network.

3. The computer-implemented method of claim 1, wherein:
the programming code of the functionality is a part of a programming code of the software application; and
the programming code of the functionality is a part of a programming code of the another software application.

4. The computer-implemented method of claim 1, further comprising:
receiving data representing the problem associated with the functionality of the software application;
determining the programming code of the functionality within the programming code of the software application; and
sending the data representing the problem and an identification of the programming code of the functionality, the data representing the problem and the identification of the programming code of the functionality being used to generate the data representing the programming code of the functionality rectifying the problem.

5. The computer-implemented method of claim 1, wherein the programming code of the functionality is characterized by an object comprising at least one of: a class, a method, a function module, and a report.

6. The computer-implemented method of claim 1, wherein the data representing the programming code of the functionality rectifying the problem indicates the location within the programming code of the functionality where the rectification has been performed.

7. The computer-implemented method of claim 1, wherein the breakpoint is deleted after a predetermined period of time passes after the insertion of the breakpoint.

8. A non-transitory computer program product storing instructions that, when executed by at least one programmable processor, cause the at least one programmable processor to perform operations comprising:
receiving data representing a programming code of a functionality of a software application rectifying a problem associated with the functionality of the software application, the functionality being a removal of items, the software application being a shopping application, the items in the shopping item being one of at least one product and at least one service, the functionality within the shopping application allowing the removal of at least one product or at least one service from a shopping cart;

determining another software application executing the functionality, the software application being used to attain a purpose that is different from another purpose for which the another software application is used, the another software application being one of a flight selection application, a video game application, and a stock trading application, the functionality within the flight selection application being the removal of flights from a user account, the functionality within the video game application being the removal of players from a team, the functionality within the stock trading application being the removal of stocks from a portfolio;

inserting a breakpoint in the programming code of the functionality of the software application and the another software application, the breakpoint being inserted at a location in the programming code of the software application where the rectification of the problem was performed;

executing the programming code of the functionality including the inserted breakpoint; and determining, based on the executing, whether the problem has been rectified in the software application and the another software application.

9. The non-transitory computer program of claim 8, wherein:
the data representing the programming code of the functionality rectifying the problem is received by a first computing device from a second computing device connected to the first computing device via a first communication network; and
the software application is executed on a third computing device connected to the first computing device via a second communication network.

10. The non-transitory computer program of claim 8, wherein:
the programming code of the functionality is a part of a programming code of the software application; and
the programming code of the functionality is a part of a programming code of the another software application.

11. The non-transitory computer program of claim 8, further comprising:
receiving data representing the problem associated with the functionality of the software application;
determining the programming code of the functionality within the programming code of the software application; and
sending the data representing the problem and an identification of the programming code of the functionality, the data representing the problem and the identification of the programming code of the functionality being used to generate the data representing the programming code of the functionality rectifying the problem.

12. The non-transitory computer program of claim 8, wherein the programming code of the functionality is characterized by an object comprising at least one of: a class, a method, a function module, and a report.

13. The non-transitory computer program of claim 8, wherein the data representing the programming code of the functionality rectifying the problem indicates the location within the programming code of the functionality where the rectification has been performed.

14. The non-transitory computer program of claim 8, wherein the breakpoint is deleted after a predetermined period of time passes after the insertion of the breakpoint.

15. A system comprising:
at least one programmable processor; and
a machine-readable medium storing instructions that, when executed by the at least one processor, cause the at least one programmable processor to perform operations comprising:
receiving data representing a programming code of a functionality of a software application rectifying a problem associated with the functionality of the software application, the functionality being a removal of items, the software application being a shopping application, the items in the shopping item being one of at least one product and at least one service, the functionality within the shopping application allowing the removal of at least one product or at least one service from a shopping cart;
determining another software application executing the functionality, the software application being used to attain a purpose that is different from another purpose for which the another software application is used, the another software application being one of a flight selection application, a video game application, and a stock trading application, the functionality within the flight selection application being the removal of flights from a user account, the functionality within the video game application being the removal of players from a team, the functionality within the stock trading application being the removal of stocks from a portfolio;
inserting a breakpoint in the programming code of the functionality of the software application and the another software application, the breakpoint being inserted at a location in the programming code of the software application where the rectification of the problem was performed;
executing the programming code of the functionality including the inserted breakpoint; and
determining, based on the executing, whether the problem has been rectified in the software application and the another software application.

16. The system of claim 15, wherein:
the data representing the programming code of the functionality rectifying the problem is received by a first computing device from a second computing device connected to the first computing device via a first communication network; and
the software application is executed on a third computing device connected to the first computing device via a second communication network.

17. The system of claim 15, wherein:
the programming code of the functionality is a part of a programming code of the software application; and
the programming code of the functionality is a part of a programming code of the another software application.

18. The system of claim 15, further comprising:
receiving data representing the problem associated with the functionality of the software application;
determining the programming code of the functionality within the programming code of the software application; and
sending the data representing the problem and an identification of the programming code of the functionality, the data representing the problem and the identification of the programming code of the functionality being used to generate the data representing the programming code of the functionality rectifying the problem.

19. The system of claim 15, wherein the programming code of the functionality is characterized by an object comprising at least one of: a class, a method, a function module, and a report.

20. The system of claim 15, wherein the data representing the programming code of the functionality rectifying the problem indicates the location within the programming code of the functionality where the rectification has been performed.

\* \* \* \* \*